United States Patent
Morice et al.

(10) Patent No.: US 9,898,391 B1
(45) Date of Patent: Feb. 20, 2018

(54) SYSTEMS AND METHODS FOR USE IN DISTRIBUTED AND INCENTIVIZED CODE TESTING

(71) Applicant: MASTERCARD INTERNATIONAL INCORPORATED, Purchase, NY (US)

(72) Inventors: Matthew Scott Morice, St. Charles, MO (US); Ravi Santosh Arvapally, O'Fallon, MO (US); Walter F. Lo Faro, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/239,404

(22) Filed: Aug. 17, 2016

(51) Int. Cl.
G06F 9/44 (2006.01)
G06F 11/36 (2006.01)
G06Q 30/02 (2012.01)

(52) U.S. Cl.
CPC ..... G06F 11/3668 (2013.01); G06Q 30/0239 (2013.01)

(58) Field of Classification Search
CPC ............ G06F 11/3668; G06F 11/3688; G06Q 30/0239
USPC ........................................................ 717/124
See application file for complete search history.

(56) References Cited

U.S. PATENT DOCUMENTS

| | | | |
|---|---|---|---|
| 2002/0053077 A1* | 5/2002 | Shah-Nazaroff | H04H 60/33 725/13 |
| 2011/0173225 A1* | 7/2011 | Stahl | G06Q 30/04 707/769 |
| 2017/0169398 A1* | 6/2017 | Washington | G06Q 10/1095 |

* cited by examiner

*Primary Examiner* — Anna Deng
(74) *Attorney, Agent, or Firm* — Harness, Dickey & Pierce, P.L.C.

(57) ABSTRACT

Systems and methods are provided for use in distributing code testing tasks among multiple testers, and incentivizing testing with rewards. One exemplary method includes testing, by a computing device, a code set, where the testing is performed by a tester associated with a profile, and receiving, by the computing device, peer tester feedback based on the testing of the code set, where the peer tester feedback is associated with at least one peer tester profile. The method also includes receiving, by the computing device, a developer decision based on the testing of the code set and/or the peer tester feedback, and rewarding, by the computing device, the profile of the tester and/or the at least one peer tester profile when the developer decision agrees with the testing of the code set and/or the tester feedback associated with the at least one peer tester profile.

18 Claims, 5 Drawing Sheets

SYSTEMS AND METHODS FOR USE IN DISTRIBUTED AND INCENTIVIZED CODE TESTING

FIELD

The present disclosure generally relates to systems and methods for use in providing a group of testers with code sets to be tested, and incentivizing the testers to participate by providing rewards.

BACKGROUND

This section provides background information related to the present disclosure which is not necessarily prior art.

Software use has become ubiquitous throughout modern society. Software projects are developed based on specific goals, requirements, and/or functionalities and are eventually released as applications for use by customers, consumers, and/or other users. Code testing is one aspect of the development of software projects. Modern software projects are becoming increasingly complex, resulting in a wide variety of potential software malfunctions, or bugs, which may be prevented, to an extent, thorough further testing. In fact, large software projects may be the result of combining code from tens, or even hundreds, of software developers, all of which must be tested, then, either by the developers themselves or by other software testers.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Large, complex software projects require thorough testing to ensure all of the various combined code segments work together in expected ways according to software requirements. The time and effort requirements of this testing may be enormous, and developers, who often test code they have written, may still occasionally miss issues and/or bugs in the code. Uniquely, the systems and methods herein enable developers to distribute code sets to groups of testers via a code testing platform which incentivizes the testers to participate in testing and provide accurate feedback to the tests. In particular, for example, a developer may upload a code set to the platform and a primary tester (or multiple primary testers) may select to test the code set. After testing, the primary tester(s) may provide feedback based on the behavior of the code set during the test and/or the results of the test. The platform may generate and publish a test report based on the tester's feedback. Other testers, or peer testers to the primary tester(s) that have already provided feedback, may provide peer tester feedback to the test report. Further, the developer may provide a decision based on the test report as to whether the feedback is accurate. The platform may reward the primary tester(s) that provided feedback based on the original testing and reporting, and/or further reward the primary tester(s) and/or peer testers based on the developer's decision with respect to the test report, or otherwise.

It should be appreciated that one or multiple primary testers may test a code set and share his/her/their test results with others (e.g., with peer testers, etc.), as well as comment on test results shared by one or more other primary testers regarding the same code set. As such, reference to a primary tester, in connection with testing a code set, should not be construed as limiting such testing for the code set to one tester, as in various embodiments, multiple different "primary testers" may test a given code set. What's more, referent to a tester as a primary tester should not be construed as liming the tester to that operation, as a primary tester may also be a peer tester for the same code set, or for different code sets.

Figure 1:
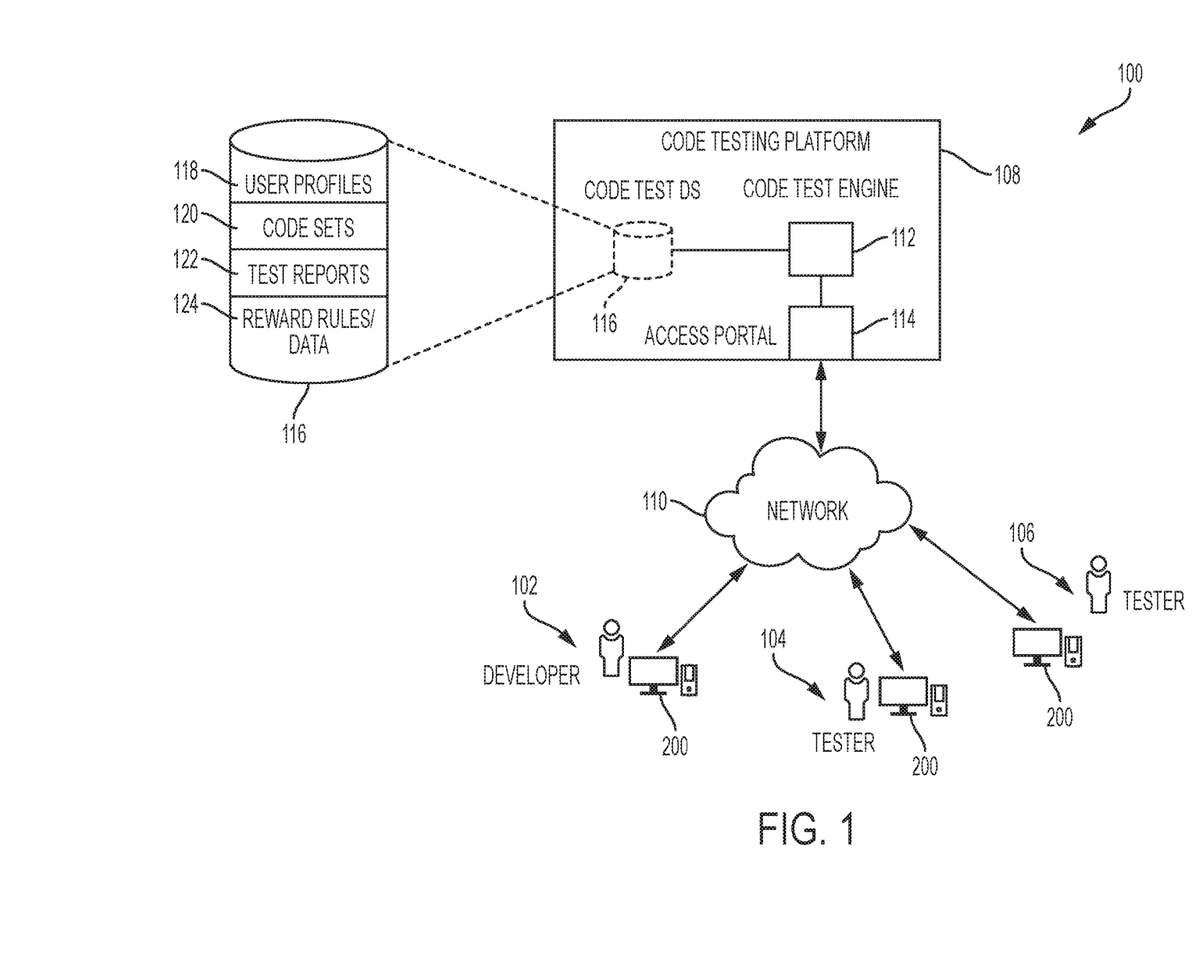
FIG. 1 is a block diagram of an exemplary system of the present disclosure suitable for use in distributing code to testers and incentivizing the testing of said code.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, inclusion of more developers and/or testers, distribution of parts of a code testing platform across multiple locations, etc.

The system 100 generally includes a developer 102 (broadly, a user), testers 104 and 106 (broadly, users), and a code testing platform 108, each coupled to, and in communication with and/or with access to, network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts or users illustrated in FIG. 1, or any combination thereof. For example, network 110 may include multiple different networks, such as a private network made accessible by the code testing platform 108 to developer 102, and, separately, a public network (e.g., the Internet, etc.), which may be accessible to the testers 104 and 106, and any other parts/users of the system 100, etc., as desired.

In general in the system 100, the developer 102 designs and/or implements code, code sets, code segments, and the like for use in software projects directed to a variety of purposes. For instance, the developer 102 may implement code for a software project for use in a payment account system that provides an interface enabling users to observe and/or control aspects of their payment accounts, such as an interface enabling a payment account holder to access transaction data for their payment account, or an interface enabling an administrator to review transaction processing statistics and make changes to the functionality of the system in response. Other code may relate to other aspects of a payment network and/or payment account system, or further, to any environment, system, or software to be developed and/or tested in general.

As one example, the developer 102 may implement code for a web-based software application for use in a payment account system that allows holders of debit cards to transfer money to other parties (e.g., to friends, family, merchants, etc.) using their debit cards, as long as their card numbers (or other identifiers of their associated accounts) are available. In other words, a card holder, acting as a sender, can send/transfer desired funds to another party, acting as a receiver, using, for example, the sender's debit card number. In connection with this web-based software application, certain functionality should be available to the card holders. For example, the card holders (i.e., senders) should be able to add accounts (e.g., debit card numbers of receivers, etc.) to their account profiles, so that desired transfers can be made; the added accounts should be verified before being added to the account profiles (e.g., the added accounts should be actual accounts, non-fraudulent accounts, etc.); the card holders should, then, be able to transfer funds to one of the added accounts, once included in their account profiles; the card holders should be able to add/append multiple debit cards to their account profiles; the accounts of the receiving parties should be verified as local accounts; etc. Further in this example, the application may be developed in Java, HTML, CSS and MySQL database, and may be deployed in a standard web-server.

Then in the system 100, upon completion of a code set by the developer 102 for a desired software project, for example, testing is necessary to confirm that the code set functions correctly and/or meets the requirements of the associated software project (e.g., to confirm that the functionality described for the above example fund transfer application is actually available for card holders, etc.). The testers 104 and 106, as described more below, then execute tests on the code set, review test results, and provide feedback on executed tests in the form of test reports, or the like. The testers 104 and 106 may be professional software testers, other developers, employees or co-workers in the developer's company/organization, or other users, such as users that are representative of users for whom the software project is intended.

The code testing platform 108 of the system 100 provides a platform for the developer 102, the testers 104 and 106, and other users to upload code sets such that it is accessible to other users, to test the uploaded code sets, to create test reports, and to provide feedback on the test reports. The code sets implemented by the developer 102 are uploaded to the code testing platform 108. The testers 104 and 106 then access the code sets and execute tests on the code sets (e.g., one or both of the testers 104 and 106, and/or other testers, may execute tests on the code sets; etc.). Further, the testers 104 and 106 (and/or other testers) may create test reports based on the results of the executed tests and provide feedback on test reports created by their peer testers (e.g., tester 104 may provide feedback on a test report created by tester 106 (and/or another tester) and/or tester 106 may provide feedback on a test report created by tester 104 (and/or another tester), etc.). The developer 102 may also provide feedback on the test reports, as well as make decisions about the code sets based on the test reports.

As further illustrated in FIG. 1, the code testing platform 108 includes a code test engine 112, an access portal 114, and a code test data structure 116. The code test engine 112 is configured to support and/or handle code testing interactions with users (e.g., code set uploads, code test execution, test report publishing, reward distribution, etc.). The code test engine 112 may implement and/or interact with the access portal 114 and store and access data in the code test data structure 116, as desired. Further, the code test engine 112 may include a suite of testing applications and programming platforms, which may be used to carry out any necessary testing of code sets (e.g., by testers 104 and/or 106, other testers, etc.), as described herein.

The access portal 114 of the code testing platform 108 is configured to provide an interface for interaction between users (e.g., the developer 102, the testers 104 and 106, etc.) and the code testing platform 108. The access portal 114 may take the form of an application program interface (API) or web interface provided by the code testing platform 108 to computing devices 200 of the developer 102 and the testers 104 and 106. In addition, the access portal 114 may be configured to provide a login page and/or interface for initially identifying a user, followed by interfaces that may be associated with the user type (e.g., developer, tester, or other user type, etc.) and/or the individual user based on a user profile of the user. For instance, a developer (e.g., developer 102), once successfully signed on through the access portal 114, may be presented with an interface enabling him/her to upload code sets and/or review test results and/or review reports of previously uploaded code sets. The code sets may be specific to the particular developer based on the developer's profile. Alternatively, or additionally, a tester (e.g., tester 104 or tester 106), once successfully signed on through the access portal 114, may be presented with an interface enabling him/her to access uploaded code sets for testing, provide feedback on executed tests for test reports, review test reports created by peer testers, and/or review reward credits specific to the particular tester based on the tester's profile. In some embodiments, the access portal 114 may include code development and testing tools, such as compilers and/or interpreters and/or integrated development environments and/or other code testing tools.

As shown, the code test data structure 116 of the system 100 includes a user profile data structure 118, a code set data structure 120, a test report data structure 122, and a reward data structure 124. The user profile data structure 118 is configured to store data relating to the profiles of developers and testers (e.g., developer 102, testers 104 and 106, etc.). Each user profile may include login information for confirming a user's identity prior to granting access to the code testing platform 108, data specific to the type of the user, and/or data specific to the particular user. For instance, a developer profile may include login information, associations with code sets uploaded by the developer, associations to test reports created with respect to code sets uploaded by the developer, etc. Alternatively, or additionally, a tester profile may include login information, associations to code sets that the tester has tested, associations to test reports for which the tester has provided peer feedback, reward credit information, etc. In addition, it should be appreciated that a profile may be both a developer profile and a tester profile, where the same user is a developer for some code and is a tester for the same code or for other code.

The code set data structure 120 of the code test data structure 116 is configured to store data related to code sets, including the code itself, code set descriptions, and test cases. Each code set includes at least code, and may also include descriptions, software requirements the code set is trying to achieve, and/or test cases. The code descriptions may be provided by the developer of the code to explain the purpose, expected functionality, etc., of the code to testers and/or other developers that view the code, as well as provide descriptions of the original software requirements of the code set. The code set may also include, either with or separate from the code descriptions, instructions that direct a tester in how to set up and/or configure a system to execute and/or test the code set. The instructions may include environmental details required to execute the code set, dependencies on other code sets, directions to access associated virtual testing environments, etc. Test cases may also be provided by the developer to direct the testing activity of the testers and/or defined by the requirements, or build descriptions of the code project. For instance, a code set may be developed based on a requirement that a notification be sent to an account issuer in the event that abnormal activity is detected associated with an account. A test case for the code set may include, based on the requirement, a test which inputs into a running instance of the code set a transaction that should be considered abnormal activity. The tester running and/or observing the test may then observe whether the running code set detects the abnormal activity and sends the required notification to the account issuer. The test cases may include white-box testing (i.e., testing the internal structures or workings of an application/code set), black-box testing (i.e., testing the functionality of an application/code set without delving into the inner workings of the code set), alpha testing (i.e., initial stage of testing involving a limited group of testers), beta testing (i.e., a stage of testing, often coming after alpha testing has completed, involving a wider group of testers, sometimes including external testers such as potential users/customers), etc. In some embodiments, developers may be able to mark particular code sets and/or test cases as important, which may result in larger reward credits for executing tests on the marked code sets and/or test cases.

Further, code sets and/or test cases of code sets may have associated time limits that indicate a due date for testing the code sets and/or executing the test cases. For instance, a code set may be set to be integrated into a version of a software project and/or released on a certain date, requiring testing of the code set to be complete by that date. As a time limit for the code set approaches and testing of the code set becomes more urgent, reward credits for executing tests on the urgent code set may increase to incentivize on-time completion of the testing. Once the time limit is passed, testers may be prevented from executing tests on the code set, or, alternatively, testing of the code set may still be allowed, but at reduced reward credits. In addition, code sets may have a different or reduced set of test cases available to testers after the code set has been released in a software project.

The test report data structure 122 of the code test data structure 116 is configured to store data relating to test report test results, and store interfaces which solicit test responses from testers, etc. A test report may include test results, conclusions drawn by a tester based on the test results, feedback from peer testers, and/or feedback from developers. A tester may include a bug report in the test report, indicating that the tester believes the behavior of the code is incorrect based on the test results. The reward data structure 124 is configured to store data relating to the reward system of the code testing platform 108, including rules determining how reward credits are distributed, how reward credits may be spent, etc. Reward data and rules will be described in greater detail below.

With that said, the code test engine 112, in conjunction with the code test data structure 116, is configured to enable users to log on to the code testing platform 108 via the access portal 114, and to provide a code set testing interface to users that are testers (e.g., testers 104 and 106, etc.). The code set testing interface may provide the testers with a list, queue, or other grouping of code sets that may be tested, information regarding types of tests that must be executed, potential reward credits for successful test completion, etc. Further, the code test engine 112 is configured to execute tests according to interactions with the testers, and generate test reports according to test results and tester feedback. The engine 112 may solicit specific responses from a tester and/or enable a tester to provide comments on the test and the results thereof. The tester feedback may include whether the test was a success or failure, which steps of the test may have failed, observations regarding performance of the code set during the test, etc. Moreover, the code test engine 112 is configured to publish the generated test reports for review by developers and other testers (peer testers), and provide reward credits to testers and peer testers based on developer feedback to the test reports.

While one developer 102, two testers 104 and 106, and one code testing platform 108 are illustrated in FIG. 1, it should be appreciated that any number of these platforms and/or users may be included in the system 100 (e.g., arranged as a social network for software testing, etc.), or may be included as a part of systems in other embodiments, consistent with the present disclosure.

Figure 2:
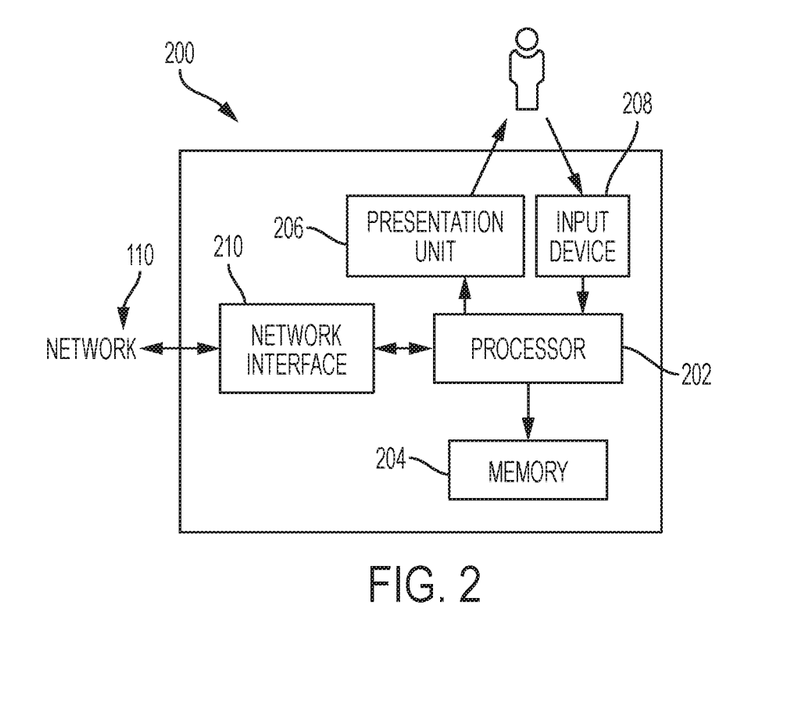
FIG. 2 is a block diagram of a computing device that may be used in the exemplary system of FIG. 1.

FIG. 2 illustrates exemplary computing device 200 used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are configured to function as described herein. As previously described, in the system 100, the developer 102 and the testers 104 and 106 are each illustrated as using a computing device 200, coupled to the network 110. Further, it should be understood that the code testing platform 108 is further implemented in one or more computing devices consistent with computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the operations described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, the data of code test data structure 116 (e.g., user profiles, code sets, test reports, reward data, etc.), and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein.

In the exemplary embodiment, the computing device 200 also includes a presentation unit 206 that is coupled to (and in communication with) the processor 202 (however, it should be appreciated that the computing device 200 could include output devices other than the presentation unit 206, etc.). The presentation unit 206 outputs information (e.g., code set upload interfaces, code testing interfaces, test report review interfaces, etc.), visually, for example, to a user of the computing device 200 such as, for example, developer 102, testers 104 and 106, and/or other users associated with the code testing platform 108, etc. Various interfaces (e.g., as defined by network-based applications, etc.) may be displayed at computing device 200, and in particular at presentation unit 206, to display and/or solicit certain information, as described herein. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from the user (i.e., user inputs) such as, for example, login information, test inputs/actions, test feedback information, test report feedback information, etc. The input device 208 is coupled to (and is in communication with) the processor 202 and may include, for example, one or more of a keyboard, a pointing device, a mouse, a stylus, a card reader, a camera, a touch sensitive panel (e.g., a touch pad or a touch screen, etc.), and/or other suitable input device. Further, in various exemplary embodiments, a touch screen may behave as both a presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces (e.g., including the network interface 210, etc.) incorporated into or with the processor 202.

Figure 3:
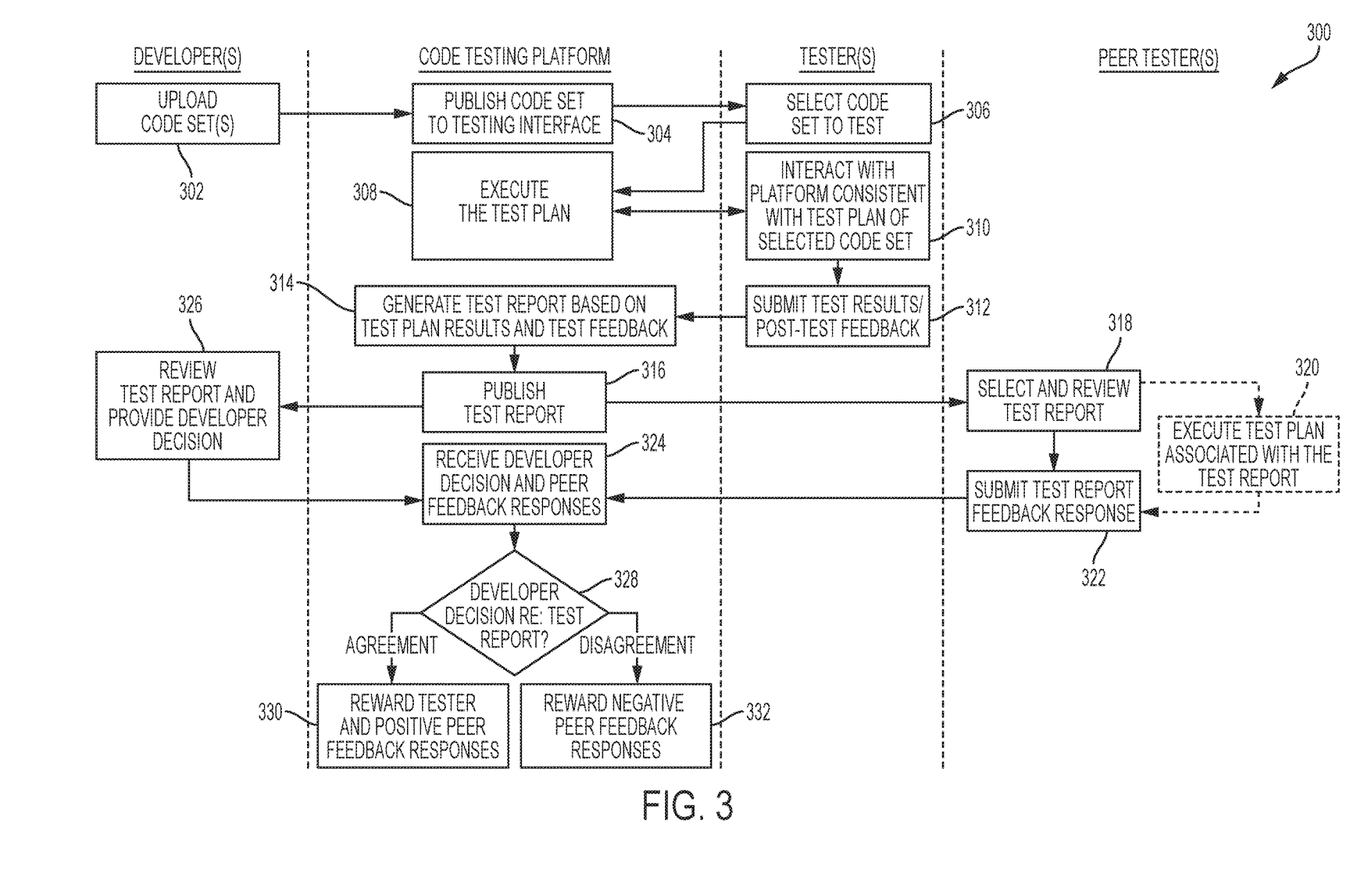
FIG. 3 is an exemplary method, which may be implemented in connection with the system of FIG. 1, for enabling a tester to execute a code test, enabling a developer and peer tester to provide feedback, and, subsequently, distributing reward credits to the testers based on decisions by the developer with respect to the code test.

FIG. 3 illustrates an exemplary method 300 for use in testing code via a platform accessible by developers and testers. In this exemplary embodiment, the method 300 is described with reference to the developer 102, the testers 104 and 106, the code testing platform 108, and further with reference to the computing device 200. It should be appreciated, however, that the methods herein are not limited to the system 100 and the computing device 200, and that the systems and computing devices herein are not limited to method 300. Further, the method 300 is described with reference to exemplary interfaces 400 and 500, shown in FIGS. 4-5, respectively. The method 300, however, should not be understood to be limited to the exemplary described interfaces 400 and 500 as other interfaces, or no interfaces, may be employed in methods described herein.

With reference to FIG. 3, in the method 300, the developer 102 initially uploads a code set (or multiple code sets) to the code testing platform 108, at 302. It should be understood that, to the extent that logging in to the code testing platform 108 is required, the developer 102 has done so prior to 302. The code test engine 112 receives the uploaded code set via the access portal 114 and stores it in the code set data structure 120 of the code test data structure 116. The uploaded code set may also be linked to the user profile of developer 102, such that the user profile data structure 118 is updated to include the link to the uploaded code set. As described above, the uploaded code set may include the code as well as code descriptions, test cases, execution environment details, code test execution instructions, etc.

Figure 4:
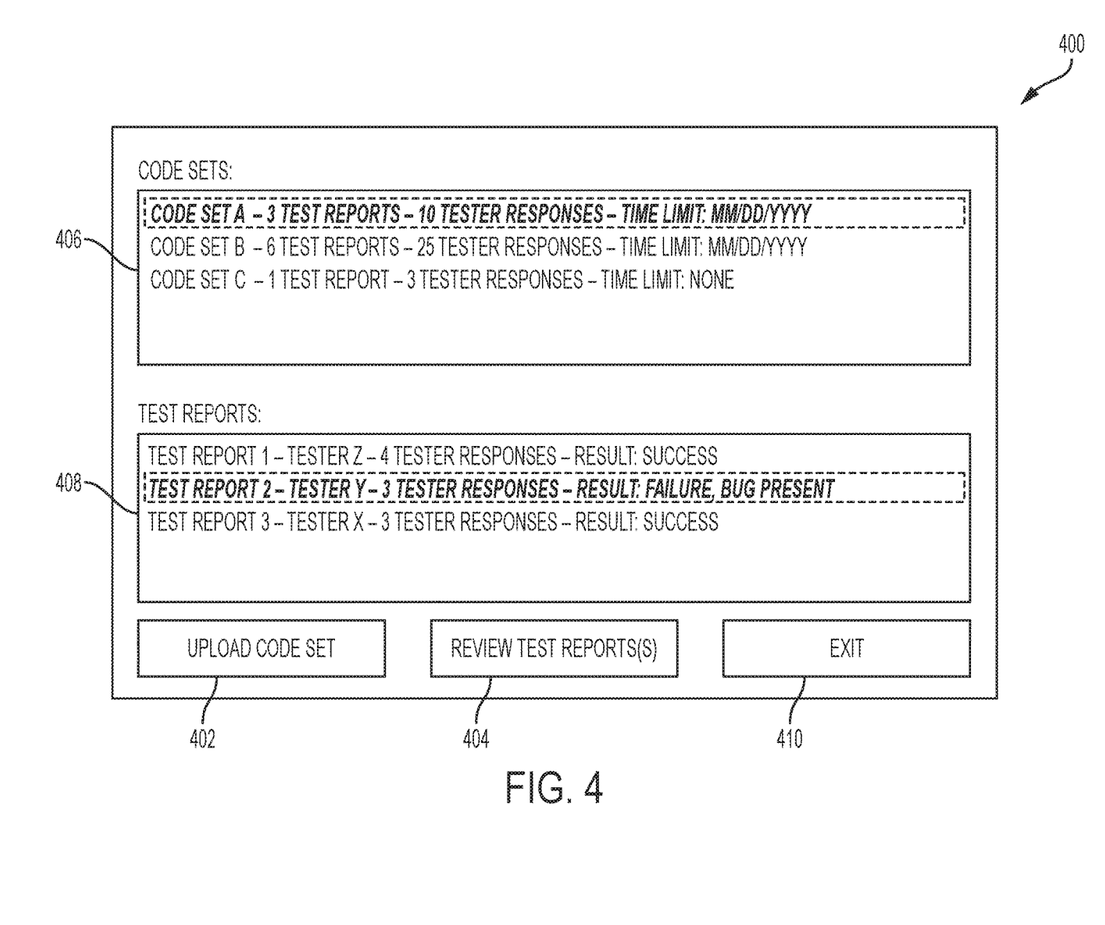
FIGS. 4-5 are exemplary interfaces associated with a computing device, which may be used in connection with the system of FIG. 1 and/or the method of FIG. 3 for enabling developers to upload code sets and to review test reports and for enabling testers to execute tests on uploaded code sets and to review test reports.

FIG. 4 illustrates an exemplary interface 400 that may be displayed to the developer 102, by the code testing platform 108, to enable the developer 102 to access the code testing platform 108 to upload a code set. As shown, the exemplary interface 400 includes an "Upload Code Set" button 402 that may be used by the developer 102 to select and upload the code set (e.g., at 302 in the method 300, etc.). Activating the button 402 may cause the interface 400 to change to display code set upload information, options, and/or instructions.

Next in the method 300, at 304, the code testing platform 108 publishes the uploaded code set to a testing interface, via the access portal 114, including information pertaining to the code set uploaded by the developer 102. Once the testers 104 and 106, then, have logged in to the code testing platform 108 via the access portal 114, the code set testing interface may be accessed by the testers 104 and 106, enabling them to view information pertaining to one or more code sets (including the code set uploaded by the developer 102) and the option to test the code sets. The information may include a name of the code set, an associated developer of the code set (e.g., developer 102, etc.), a description of the code set, the software functionality requirement(s) the testing activity desires to achieve, and/or one or more test cases associated with the code set. Additional information may be provided that indicates how many times the code set has been tested previously, a reward credit value for testing the code set, and/or a due date/time limit by which the code set must be tested.

In turn, the tester 104, as a primary tester for example, selects a code set to test from the code set testing interface, at 306 (e.g., the code set uploaded by the developer 102, etc.). Selection of the code set to test may include selecting a code set, selecting a test case associated with a code set, etc. As described above, it should again be appreciated that there may be multiple primary testers of the code set selected by tester 104 (e.g., tester 106, other testers, etc.).

Figure 5:
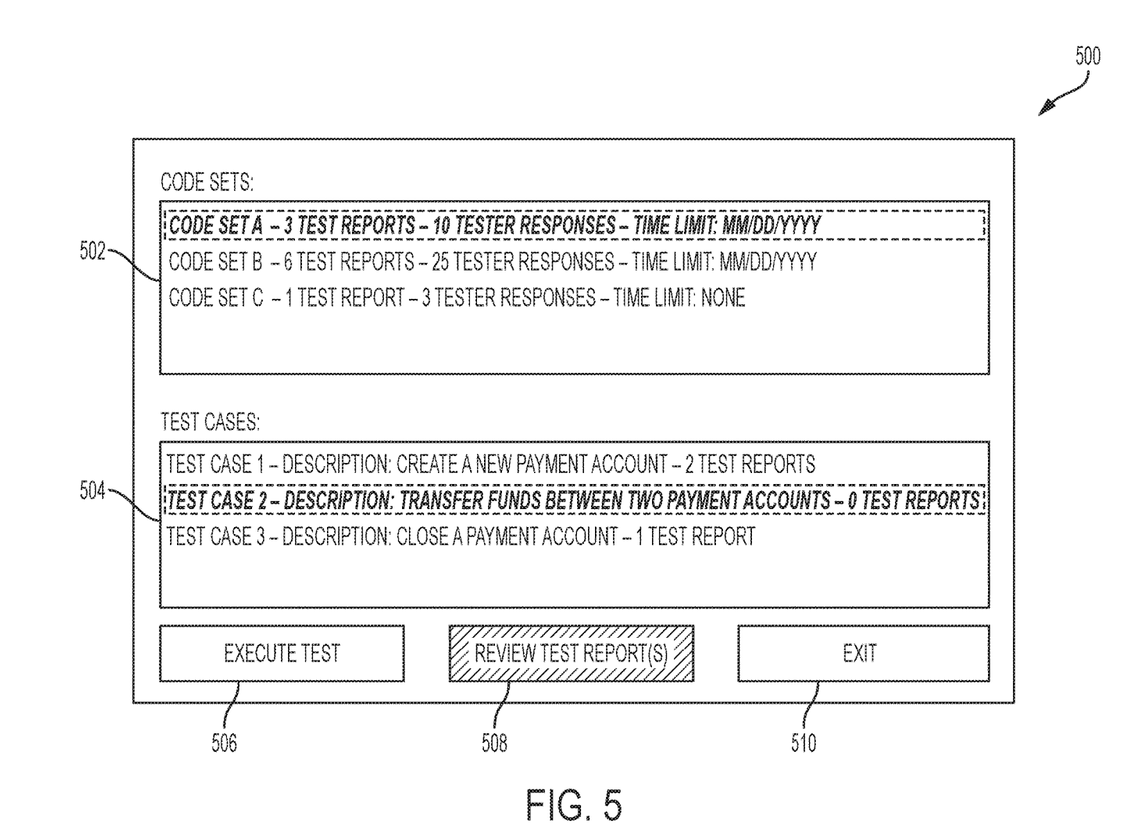

FIG. 5 illustrates an exemplary interface 500 that may be displayed to the tester 104, for example, by the code testing platform 108, to enable the tester 104 to select the code set to test. As shown, the exemplary interface 500 includes a list 502 of code sets that may be tested by the tester 104. The list 502 of code sets includes, for each code set entry, a code set name, a number of test reports available for the code set, a number of tester responses/feedback provided for the code set, and a time limit of the code set. In the illustrated interface 500, Code Set A is selected in the list 502, as represented by the bolded font of the row. The tester 104 may select other code sets in the list 502 by interacting with the different code sets.

The interface 500 also includes a test case list 504, which displays the available test cases associated with the selected code set from the list 502. As shown, Code Set A (selected in the list 502) has three available test cases (i.e., Test Case 1, Test Case 2, and Test Case 3) as shown in list 504. Test Case 2 is selected in the interface 500, as indicated by the bolded font of the row in the list 504. Additional information is available in the list 504 for each test case, including a test case description and a number of test reports associated with the test case. The selected Test Case 2 currently has zero associated test reports. In order to execute a test of the Code Set A according to Test Case 2, the tester 104 may interact with the "Execute Test" button 506, which may finalize the code set selection (e.g., at 306 in the method 300, etc.), causing the interface 500 to then present the tester 104 with test-specific information and/or instructions.

Referring again to FIG. 3, after the tester 104 selects a code set to test, the platform 108 executes the test plan, at 308, in concert with the tester 104 and based on the interactions of the tester 104 with the platform 108. In connection therewith, the tester 104 interacts with the platform 108, specifically the code test engine 112, according to a test plan for the selected code set, at 310. It should be understood that the interactions between the tester 104 and the platform 108 may include multiple operations/transitions between 308 and 310. For instance, a test plan may require tester 104 to compile code, run code, interact with running code, observe behavior of running code, provide feedback based on code behavior, etc. The testing may take the form of white-box testing, black-box testing, alpha testing, beta testing, etc. It should be understood that the execution of the test plan may include code testing techniques and methods known in the art and remain consistent with the present disclosure.

As an example, with reference to the interface 500 of FIG. 5, the tester 104 may desire to execute a test for Code Set A according to Test Case 3. As indicated in the interface 500 (in the list 504), Test Case 3 relates to closing a payment account, with the desired functionality that, when an end-user of Code Set A selects an option to close a payment account, the payment account will be closed completely.

In this example, Code Set A, as developed by the developer 102, for example, has various functions in the software code, each with particular jobs: Function-1: Close the payment account; Function-2: Delete account number from database; Function-3: Delete transaction history from database; and Function-4: Delete personal information of end-user and send the confirmation to Function-1: Close the payment account. These functions interact and call one another. Function-1 calls Function-2; Function-2 calls Function-3 when Function-2 is successful; Function-4 is called by Function-3 when Function-3 is successful; and Function-4 sends a confirmation back to Function-1 after it is successful. As part of Test Case 3, this communication between Functions-1, 2, 3, and 4 may be tested by the tester 104. For example, the tester 104 may run Function-1 and ensure the communication flow among all the functions is smooth. In so doing, the tester 104 may use the required Java programming language platform, Junit platform, or any other desired programming language and/or testing platform to conduct unit testing on these functions, and/or may conduct integration testing, which includes integration of all the functions. Resulting test reports, observations, obtained-test results, etc. will then be shared, by the tester 104, with the developer 102.

Once the test plan execution is complete, the tester 104 may provide post-test feedback based on the test plan and submit the test results and any post-test feedback to the code testing platform, at 312. The post-test feedback of the tester 104 may be based on the behavior of the code set as the test was being executed and/or test results after the test was executed. The feedback of the tester 104 may include information/details about what occurred during the test, details about behavior and/or results that the tester 104 perceives to be correct, and/or details about behavior and/or results that the tester 104 perceives to be incorrect. A conclusion of whether the test was a success or a failure may be included in the post-test feedback by the tester 104. Any feedback provided by the tester 104 during the test may be included in the test results as well. The test results and post-test feedback are submitted to the code testing platform 108 via the access portal 114.

At 314, the code testing platform 108, specifically the code test engine 112, generates a test report based on the results of the executed test plan and the test feedback provided by the tester 104 (at 312). The generated test report is stored by the code test engine 112 in the test report data structure 122 of the code test data structure 116. The test report may be associated with the code set upon which the test plan is based and the user profile of tester 104. A code set name and/or identifier, test plan timestamp, test results, test log, and/or tester feedback may be included in the test report. It should be appreciated that, in various embodiments, the tester 104 remains anonymous.

Once generated, the test report is published on the code testing platform 108, at 316, enabling developers (e.g., the developer 102, etc.) and peer testers to the tester 104, such as tester 106, to review it. The test report may be added to or appear on the interfaces displayed to the developer 102 and to the tester 106 (e.g., interfaces 400 and 500, etc.). In some embodiments, the test report may be sent only to the developer 102 that uploaded the code set for developer feedback, while in alternative embodiments, the test report may be viewable by other developers as well. Other testers, such as tester 106, are provided the test report in order to gather peer tester feedback. As described above, it should again be appreciated that, while tester 104 is described above as testing the code set uploaded by the developer 102, he/she may also act as a peer tester for the same code set based on a test report generated for a test performed by another tester of the code set.

At 318 in the method 300, the tester 106, who is a peer tester to tester 104 in this description/example, selects and reviews the published test report. In addition, the tester 106 may optionally, as indicated by the dotted lines in FIG. 3, execute the test plan, at 320, in order to observe and/or confirm the test results and/or conclusions of the published test report. In either case, a feedback response by the peer tester 106 to the test report is then generated. The feedback response may include, for example, an indicator of agreement or disagreement with the conclusion of tester 104 in the test report (e.g., an "up-vote" or a "down-vote", etc.) and/or a comment about the test report. And, once the tester 106 completes the test report feedback response, he/she submits the feedback response to the code testing platform 108, at 322, and in turn the feedback response is received by the code testing platform 108, at 324.

In addition, in various embodiments, once the code testing platform 108 receives the feedback response (at 324), it may transmit an alert (or other message) (e.g., via email, SMS, etc.) to one or more of the developer 102 and the tester 104 (as interested parties in the code set and the test report being reviewed by the tester 106) indicating that the feedback response has been completed. As such, the developer and the tester 104 are made aware of the feedback response. Further, in some embodiments, other users (other than the developer or the testers 104 and 106) may request to receive alerts, from the code testing platform 108, for particular code sets in which they are interested, for example, when others have performed some activity with regard to the particular code sets (e.g., uploaded a code set, tested a code set, completed a review of a test report, etc.). Moreover, in some embodiments, all users associated with a particular code set (e.g., the developer 102, the testers 104 and 106, etc.) may receive an alert, from the code testing platform 108, when a time limit set for completing a certain task regarding an uploaded code set (or other aspect thereof) is updated/modified by the developer 102 (or another).

With reference again to the exemplary interface 500 of FIG. 5, as shown, the interface 500 includes a "Review Test Report(s)" button 508, which may enable a tester (e.g., tester 106 in the method 300, etc.) to access the published test report of a tester (e.g., tester 104 in the method 300, etc.). Because Test Case 2, which is currently selected, has no associated test reports, the button 508 is illustrated as disabled. If Test Case 2 had at least one associated test report (e.g., a test report based on the test executed by the tester 104, etc.), the button 508 may be available. Alternatively, if the tester selected a different test case that had associated test reports (e.g., Test Case 1, Test Case 3, etc.), the button 508 may be available as well. In any case, upon interaction with the button 508, when available, the interface 500 may change to present test report-specific information and/or instructions to the tester (e.g., enabling the tester to up-vote or down-vote the test report as part of a feedback response, enabling the tester to comment on the test report as part of a feedback response, etc.). When a tester is done executing code tests and/or reviewing test reports, the tester may activate the "Exit" button 510, which may cause the tester to log out of the code testing platform 108. Thus, as can be seen via the interface 500, the same tester may be a primary tester for a code set whereby the tester generates one or more test reports for the code set, as well as a peer tester whereby the tester reviews other test reports for the same code set (generated by other primary testers of the code set).

Referring back to FIG. 3, separately in the method 300, once the test report is published on the code testing platform 108 (at 316), the developer 102 is notified (e.g., as described above, etc.) and reviews the published test report and provides feedback in the form of a developer decision, at 326. The developer decision may comprise an indicator of whether the developer 102 agrees or disagrees with the test report. For instance, if the test report includes a report that the code set contains a particular bug (i.e., the code set does not function correctly under certain circumstances), the developer 102 may agree that the bug exists, or disagree indicating that the bug does not exist and/or that the behavior is expected/intended. Additionally, or alternatively, the developer decision may include a comment or explanation of the decision which may later be viewed by the testers 104 and 106 and/or by other developers, and/or may include a score or rating of the test report and the conclusion(s) therein. Further, the developer 102 may also review the test report feedback response from the peer tester 106 received by the code testing platform (at 324).

The developer decision is then received by the code test engine 112 of the code testing platform 108, at 324, via the network 110 and the access portal 114. The developer decision may be stored with the associated test report in the test report data structure 122 and linked to the user profile of the developer 102 in the user profile data structure 118. The peer tester feedback response(s) may also be stored with the test report in the test report data structure 122 and linked to the user profiles of each peer tester in the user profile data structure 118. The code testing platform 108 may prevent further feedback from peer testers after receiving the developer decision, as the test report feedback may be considered complete when the developer 102 makes a decision based on the test report.

With reference again to FIG. 4, the interface 400 includes a "Review Test Report(s)" button 404 which may enable the developer 102 to access published test reports, such as a test report based on the test execution of tester 104 (e.g., as submitted at 322 in the method 300, etc.). The button 404 may be activated to view test report information associated with desired selections from a list 406 of code sets and a list 408 of test reports. As shown, Code Set A is currently selected in the code set list 406, as represented by the bolded font. Code Set A has three test reports, ten tester responses, and a time limit represented by a generic date place holder (which may be any desired date). Alternatively or additionally, the time limit may include a specific time and/or the time limit may include a length of time from the present to the time limit (e.g., 20 days, one month, etc.). The test report list 408 displays information associated with the three test reports of selected Code Set A, including test names, the tester that executed the tests (which may not be the tester's real name, in order to preserve tester anonymity), the number of tester responses, and test result information. In this case, Test Report 2 is selected, as represented by the bolded font. Tester Y (who may be tester 104, tester 106, or another tester) reported that the test failed and that a bug is present in the code set. Developer 102 may select Test Report 2 and activate button 404 in order to review the test report and provide feedback and/or a developer decision (e.g., at 326 in the method 300, etc.), based on the test report. Additionally, the interface 400 includes an "Exit" button 410 that enables the developer 102 to exit the code testing platform 108 when he/she is finished. It should be appreciated that more, less, and/or different code set information may be displayed in alternative interface embodiments, for example, in the list 406. Similarly, more, less, and/or different test report information may be displayed in alternative interface embodiments, for example, in the list 408.

Again referring to the method 300 in FIG. 3, once the developer decision is received by the code testing platform 108, the code test engine 112 of the code testing platform 108 determines, at 328, how to distribute reward credits based on the developer decision. If the developer decision is in agreement with the test report, the code testing platform 108 rewards the tester 104 and the peer testers that provided positive feedback responses (e.g., peer tester 106, etc.), with credits, at 330. Alternatively, if the developer decision disagrees with the test report, the code testing platform 108 rewards the peer testers that provided negative feedback responses to the test report, at 332.

The amount of credits rewarded to testers in the systems and methods herein may be determined based on reward rules stored in the reward data structure 124. The reward rules may include rules that determine how many credits are provided, how the credits are distributed among multiple testers, what the credits can be used for, etc. For instance, a reward rule may establish that, for each test report, there are 100 credits to be distributed. When credits are distributed for a test report, the rule may establish that the tester of the test report (in the embodiment of FIG. 3, tester 104, for example) receives half of the 100 credits if the developer decision agrees with the test report. The other half of the credits may be distributed evenly between the testers who provided peer tester feedback in agreement with the test report. Alternatively, if the developer decision disagrees with the test report, the entire 100 credits may be distributed evenly between the tester and the testers who provided peer tester feedback.

Additionally, or alternatively, reward rules may establish that additional credits are available for testers who are one of the first to execute tests on a code set, or additional credits may be provided for testing code that has been marked as important or urgent by developers, or if a time-limit of the code set is imminent. Reward rules may also address effort made by testers to accurately identify any bugs in the codes sets, for example, where one tester reported a bug while another tester did not. Additional credits may be provided to the correct tester (i.e., the tester reporting the bug if the bug actually exits, or the tester that did not report the bug if the bug does not actually exist).

Further reward rules may define the exchange rate of reward credits for goods and/or services. For instance, reward rules may establish that a certain number of reward credits may be exchanged by testers for gift cards/certificates, prizes, a Tester Certificate, etc. Once a tester has accrued sufficient reward credits, the tester may request to exchange the credits for one or more of the available goods and/or services. Upon the exchange request being fulfilled, the number of reward credits associated with the tester's profile is reduced accordingly. A Tester Certificate, for example, may include a certificate that is awarded to a tester appreciating the time spent and the knowledge he/she has in testing. Such a certificate may be in the form of a badge or the like, visible to everyone at the tester's profile, for example, via the code testing platform 108. With that said, it should be appreciated that a tester can share information on his/her profile, such as domain experience on data, development proficiency such as Java, .Net or testing tools expertise, testing conducted on projects, rank, etc.

In view of the above, the systems and methods herein may enable developers to use the described code testing platform of the present disclosure (e.g., platform 108, etc.) to distribute code sets and incentivize testers to test the code sets. In this manner, for example, with reference to the system 100, the developer 102 uploads a code set, the tester 104 tests the code set and causes a test report to be generated, and the developer 102 and tester 106 review the generated test report. Based on a developer decision of developer 102 with respect to the test report, the platform 108 may reward the tester 104 and/or the tester 106 with credits. Thus, the described platform of the present disclosure enables the distribution of code sets such that they are scrutinized by many different testers, therefore increasing the number of issues that are found and fixed (e.g., decreasing the number of bugs in code sets by allowing them to be fixed, etc.), increasing the quality of the code sets, etc.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by: (a) testing a code set; (b) receiving tester feedback based on the testing of the code set, the tester feedback associated with at least one tester profile; (c) receiving a developer decision based on the tester feedback; (d) rewarding the at least one tester profile when the developer decision agrees with the tester feedback associated with the at least one tester profile, whereby at least one tester associated with the at least one tester profile is incentivized to test the code set; and (e) generating a test report associated with the tester feedback.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for testing code, the method comprising:
   receiving, by a computing device, a code set from a developer and storing the code set in a data structure included in a non-transitory memory device, the code set associated with a developer profile of the developer;
   executing, by a primary tester of multiple testers, at the computing device, a test on the code set;
   receiving, by the computing device from the primary tester, test results based on executing the test on the code set, the test results associated with a tester profile of the primary tester;
   generating, by the computing device, a test report based on at least the test results and publishing the test report, the test report associated with the profile of the primary tester;
   receiving, by the computing device, a peer feedback response related to the published test report from a peer tester of the multiple testers, the peer feedback response associated with a tester profile of the peer tester;
   receiving, by the computing device, from the developer, a developer decision based on the published test report and/or the peer feedback response; and
   rewarding, by the computing device, credits to the tester profile of the primary tester when the developer decision agrees with the published test report, and/or rewarding credits to the tester profile of the peer tester when the developer decision agrees with the peer feedback response.

2. The method of claim 1, wherein the test report includes a bug report based on the test results from the primary tester; and
   wherein the developer decision agrees with the test report when the developer decision acknowledges that the bug report identifies a bug within the code set.

3. The method of claim 1, wherein the test report includes a bug report based on the test results from the primary tester; and
   wherein the developer decision disagrees with the test report when the developer decision determines that the bug report defines expected behavior within the code set.

4. The method of claim 1, wherein the code set includes a test case; and
   wherein executing the test includes executing the test according to a code set test defined by the test case.

5. The method of claim 4, wherein the test case defines the code set test as at least one of a white-box test, a black-box test, an alpha test, and a beta test.

6. The method of claim 4, wherein the test case includes a time limit by which the testing of the code set is scheduled to be completed.

7. The method of claim 1, wherein the peer feedback response includes at least one of an approval of a conclusion of the test report, a disapproval of a conclusion of the test report, and a comment pertaining to the test report.

8. The method of claim 1, wherein rewarding credits to the tester profile of the primary tester and/or the profile of the peer tester includes:
   determining an amount of reward credits based on at least one reward rule; and
   awarding the determined amount of reward credits to the tester profile of the primary tester and/or the profile of the peer tester.

9. The method of claim 8,
   wherein awarding the determined amount of credits to the tester profile of the primary tester includes, when the developer decision agrees with the test report, awarding, based on the at least one reward rule, a first portion of the determined amount to the tester profile of the primary tester and awarding a second portion of the determined amount to the tester profile of the peer tester.

10. A system for testing code, the system comprising:
    a non-transitory memory device configured to store developer profiles for multiple developers, tester profiles for multiple testers, and code sets provided by developers for testing; and
    an engine in communication with the non-transitory memory device, the engine configured to:
      receive a code set from a developer and store the code set in the non-transitory memory device, the code set associated with a developer profile of the developer;
      execute a test on the code set in response to a selection by a primary tester of the multiple testers;
      receive, from the primary tester, test results and/or feedback associated with the executed test;
      generate a test report based on the test results and/or the feedback and then publish the test report;
      receive peer feedback related to the published test report from a peer tester of the multiple testers;
      receive a developer decision, from the developer, based on the published test report and/or the peer feedback; and
      award credits, in the non-transitory memory device, to a tester profile of the primary tester based on at least the developer decision agreeing with the published test report, and/or award credits, in the non-transitory memory device, to a tester profile of the peer tester based on at least the developer decision agreeing with the peer feedback related to the published test report.

11. The system of claim 10, further comprising an access portal; and
    wherein the engine is configured, in connection with receiving the code set from the developer and/or in connection with receiving the developer decision, to:

interact with the access portal to receive a login request from the developer to access the developer profile of the developer, via a computing device associated with the developer; and when the login request is authenticated, grant access to the developer profile of the developer.

12. The system of claim 11, wherein the access portal further includes at least one of a compiler, an interpreter, an integrated development environment, and one or more testing tools.

13. The system of claim 10, wherein the engine is further configured to:

receive a credit exchange request from the primary tester; and cause the credit exchange request to be fulfilled when the tester profile of the primary tester includes sufficient credits.

14. The system of claim 10, wherein the code set includes a code segment and a test case; and wherein the engine is configured, in connection with executing the test on the code set, to execute the test on the code segment based on the test case.

15. The system of claim 14, wherein the test case defines at least one of a white-box test, a black-box test, an alpha test, and a beta test.

16. The system of claim 10, wherein the engine is configured, in connection with executing the test on the code set, to retrieve the code set for testing, a test case, and/or the tester profile of the primary tester from the memory device.

17. The system of claim 10, wherein the engine is further configured to display the test report associated with the code set to the developer at a computing device associated with the developer.

18. The system of claim 10, wherein the engine is further configured to generate a notification identifying credits awarded to the primary tester and transmit the notification to the primary tester via the tester profile of the primary tester.

* * * * *